United States Patent [19]

Bolt et al.

[11] Patent Number: 4,769,769

[45] Date of Patent: Sep. 6, 1988

[54] COMMUNICATION SYSTEM INCLUDING A FIRST-IN-FIRST-OUT BUFFER

[75] Inventors: Durk J. Bolt; Gregorius A. J. Boersma, both of Beekbergen, Netherlands

[73] Assignee: U.S. Philips Corporation, New York, N.Y.

[21] Appl. No.: 854,259

[22] Filed: Apr. 21, 1986

[30] Foreign Application Priority Data

Apr. 19, 1985 [NL] Netherlands .......................... 8501143

[51] Int. Cl.⁴ ............................................. G06F 13/00
[52] U.S. Cl. ..................................................... 364/200
[58] Field of Search ... 364/200 MS File, 900 MS File

[56] References Cited

U.S. PATENT DOCUMENTS 4,159,532  6/1979  Getson, Jr. et al. ................ 364/900

Primary Examiner—Raulfe B. Zache
Attorney, Agent, or Firm—James J. Cannon

[57] ABSTRACT

A communication system is described for the transfer of messages between a source device and a destination device. There is provided an end-around coupled series of storage control sections, it being possible to chain a non-branching series of messages to each section. There is provided a "busy/not-busy" indicator, a pointer mechanism for indicating a current storage control section for each of the devices, and a notification device which enables the source device with a "signal" in order to signal an activity. Suitable control prevents deadlock and also individual starvation situations.

3 Claims, 1 Drawing Sheet

COMMUNICATION SYSTEM INCLUDING A FIRST-IN-FIRST-OUT BUFFER

The invention relates to a communication system which includes a source device for supplying a sequence of messages, a destination device for receiving the messages in the same sequence, and a first-in-first-out buffer which is connected between the source device and the destination device for the temporary storage of the messages, which buffer includes a "busy/not-busy" indicator having a position "not busy" for granting a request for access to the buffer and a position "busy" for rejecting a further request for access during the execution of an access operation, and also storage means for a read pointer and a write pointer.

There are two categories of first-in-first-out buffers: buffers with shifting information and buffers with stationary information. In this context only the second category will be considered. In the case of input/output of data the write and read pointers, respectively, must be updated. Buffers of this kind are used in order to cope with a temporary situation where the number of messages supplied exceeds the number of messages output. In given circumstances the source device may have the impression that the storage capacity is infinitely large. A buffer of this kind is known from U.S. patent specification No. 4,374,428. Generally, conflicts are liable to arise between requests for access originating from the source device and those originating from the destination device. It is an object of the invention to achieve conflict-free control of the buffer by means of a simple organization in which messages are processed in the same sequence by both devices, while precluding the occurrence of both so-called deadlock and starvation situations, and in which all messages are ultimately processed and the number of operations is still restricted to a low maximum. The object is achieved in accordance with the invention in that the buffer forms part of a general purpose random access memory in the communication system, there being provided a storage control mechanism with an end-around coupled series of $n \geq 2$ storage control sections whereto a respective non-branching series of messages stored in respective storage spaces can be chained by way of reference information between the storage spaces, the "busy/not-busy" indicator having "busy" positions, each of which positions indicates that the source device executes an access operation in respect of a non-branched series associated with a respective storage control section, all storage control sections being provided with a bivalent "empty/not-empty" indicator, there being provided a notification element for storing a "signal" from the source device to the destination device, and memorizing means for the source device and the destination device which indicate a current storage control section for the respective devices, the source device including means for setting the "busy"/"not-busy" indicator to the position "busy" for an access operation, for filling the storage control section indicated as being the current one by the memorizing means for the source device, when this system is empty, with pointer information indicating the message then supplied, at the same time setting the "empty/not-empty" indicator for the relevant storage control section to the position "not-empty" and incrementing the memorizing means in order to indicate the next storage control section of the end-around coupled series as being the current one for the source device, for chaining the message to be supplied to the non-branching series which emerges from the directly preceding storage control section of the end-around coupled series when the storage control section indicated as being the current one for the storage device by the memorizing means is not empty, and for always setting the "busy/noy-busy" indicator to the position "not busy" after the supply of the message, and for supplying said "signal", the destination device including means for resetting the notification element in order to deactivate said "signal" in the case of an access operation, for terminating the access operation when the "busy/not-busy" indicator is in the position "busy", for terminating the access operation when the "empty/not-empty" indicator for the current storage control section of the destination device is in the position "empty" and, if the access operation is not terminated in this manner, for fetching messages from the non-branching series indicated by the relevant storage control section in as far as this series goes, for setting the "empty/not-empty" indicator of the relevant storage control section to the position "empty" when all messages of this series has been fetched, for setting the memorizing means to the next storage control section of the end-around coupled series, and for executing a further access operation as from the resetting of said notification element. In a simple case $n=2$, so that a variety of signalizations can be realized in an elementary manner.

In a presently preferred embodiment of this invention, a communication system includes a source device for supplying messages according to a predetermined sequence, a destination device for receiving the messages according to a predetermined sequence, and a first-in-first-out buffer which is connected between the source device and the destination device for temporary storage for the messages. The buffer includes a "busy/not-busy" indicator which has a "not busy" position for granting a request for access to the buffer and a "busy" position for rejecting a further request for access during execution of an access operation. The buffer also includes storage means for a read pointer and a write pointer. Preferably the buffer forms part of a general purpose random access memory in the communication system. A storage control mechanism is provided with an end-aroud coupled series of $n \geq 2$ storage control sections whereto a respective non-branched series of messages stored in respective storage spaces can be chained by way of reference information between the storage spaced. The "busy/not-busy" indicator has a number of n "busy" positions, each of which indicates that the source device executes an access operation in respect of a non-branching series associated with a respective storage control section. All the storage control sections are provided with a bivalent "empty/not-empty" indicator A notification element for storing a "signal" from the source device to the destination device, and memorizing means for indicating one current storage control section for each of the source device and the destination device respectively are provided. The source device includes means for setting the "busy/not busy" indicator to the position "busy" for an access operation, for filling the current storage control section for the source device by the memorizing means, when this section is empty, with pointer information indicating a message then supplied, simultaneously setting the "empty/not-empty" indicator for the last mentioned storage control section to the position "not-empty" and incrementing the memorizing means in order to indicate a next storage control section of the end-around coupled series as being the current storage control system for the source device, for chaining a next message to be supplied to the non-branched series which strats from a directly preceding storage control section of the end-around coupled series when the storage control section indicated as being the current storage control section for the source device by the memorizing means is not empty, and for always setting the "busy/not-busy" indicator to the position "not busy" after supply of the last mentioned message, and for supplying said "signal" the destination device including means for resetting the notification element in order to deactivate said "signal" in case of an access operation, for terminating the access operation when the "busy/-not-busy" indicator is in the position "busy", for terminating the access operation when the "empty/not-empty" indicator for the current storage control section for the destination device is in its position "empty" and, if the access operation is not terminated in this manner, for fetching messages from the non-branching series indicated by the current storage control section in as far as this series goes, for setting the "empty/not-empty" indicator of said current storage control section to its position "empty" when all messages of this series have been fetched, for setting the memorizing means to a next storage control section of the end-around coupled series, and for executing a further access operation as from resetting of said notification element.

Attractive embodiments are recited in the dependent claims.

BRIEF DESCRIPTION OF THE FIGURES

The invention will be described in detail hereinafter with reference to some figures.

DESCRIPTION OF AN EMBODIMENT

1. Introduction

Figure 1:
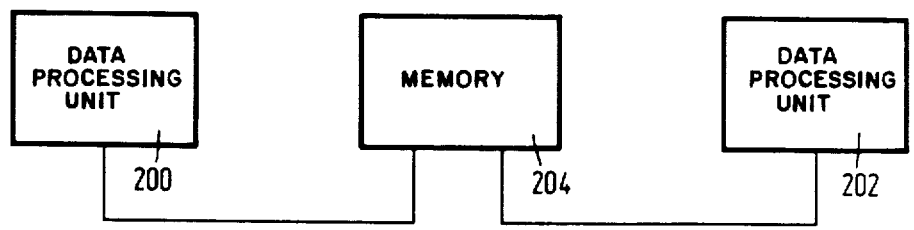
FIG. 1 shows a communication system in accordance with the invention.

The communication system involves a communication procedure between two autonomous data processing units (200, 202) as shown in FIG. 1. These units are interconnected by way of a data path yet to be defined. The units are autonomous, which means that they can initiate activities in a completely autonomous manner. Viewed in time, these activities are not interrelated either. In other words, neither units knows when the other unit undertakes a given action.

The units wish to exchange data. For this purpose they make use of said data path. In the present embodiment the data path is formed by a random access memory (RAM) (204). Both units can independently access this memory (read and write operations). There is provided a known memory arbitration means which ensure that the requests are dealt with in the sequence of arrival and which intervene, if necessary (see FIG. 1).

In a first instance, the communication system provides communication in one direction, from unit 200 to unit 202 or vice versa. However, the communication systems is capable of realizing a number of separate communication operations simultaneously, each operation complying with the protocol to be described hereinafter, for example from 200 to 202 and also from 202 to 200. Several autonomous data streams from A to B are also feasible, each stream being controlled in accordance with the protocol.

For the sake of simplicity, only one communication operation from unit A to unit B will be described.

The unit regularly wishes to dispatch information to the unit B. These units of information will be referred to hereinafter as messages. The functional content of these messages is irrelevant: the content may be commands, questions or pure data etc. Such a message is placed in the memory 204 by the unit A. How does the unit B know that a message is available in the memory? A informs B by means of a "signal". To this end, a facility is provided between the two units. For the protocol it is irrelevant how such a signalling facility is realized. Unit B will respond to the "signal" sooner or later (because it is an autonomous unit) and will fetch the message, for processing.

The communication system enables the unit A to dispatch a plurality of messages, regardless of the progress in the processing of the messages by the unit B. Therefore, A need never postpone the supply of new messages because of arrears in the fetching by B of already supplied messages. For the sake of clarity, some methods of making a series of messages available will be described hereinafter.

In the memory a row of fixed positions could be defined in which A can store messages in a sequence and wherefrom B can fetch these messages in the same sequence. There are at least two problems. First of all, the number of free positions is limited: what will happen when B is not very active while A is very active and continues to supply messages? At a given instant A will have to stop the supply of messages and await a signal from B that the latter has vacated some positions again. However, this in conflict with the principle described above. The second problem is: now will B know that A is awaiting a signal from B? Again this condition cannot be unambiguously defined. In order to ensure reliability, B could apply a signal to A directly after having fetched another message so that, if A were waiting, it could start in a vacant position again. However, this procedure is again in conflict with the above principle and unnecessarily burdens A.

A further alternative is feasible for the described, rejected method of message transfer. Let us take an "infinite" row of vacant positions. This can be realized more easily than appears possible at first glance. If it is agreed upon that in each message there is reserved a space for a pointer to a next message, the object will already be achieved. For as long as A can supply a message, it is also capable of chaining it to the row of messages already made available, because the last message thereof includes a position for a pointer to the message just supplied. The problem lies in the chaining of the new message. How can A know at the instant of chaining that the previous message is still present or not? Testing of a possible indicator in the message, set by B, offers no solution: the message may already have been fetched by B. Moreover, even if the test reveals that the message is still present at that instant, the situation may have changed already a fraction of a (micro) second later. The solution will be described hereinafter.

2. Structural elements:

First the elements which participate in the communication will be successively described. The exact procedure utilizing and controlling the elements will be described in the next chapter.

2.1. Units:

The communication takes place between two autonomous units which may be, for example two CPUs or a Control Unit for a peripheral apparatus and a CPU. They are autonomous units in the sense that they act independently of one another. Control in each unit will usually be performed by a microprocessor which includes a local memory.

2.2. The memory:

There is provided one memory which can be accessed by both units. Messages can be stored in and removed from the memory. The memory also includes other elements yet to be described. Both units can access the memory autonomously at any instant. The memory in principle grants access in the order of requests received. In the case of simultaneous requests from both units, arbitration takes place; the requests are then successively dealt with. The method used in respect to this arbitration is beyond the scope of the present invention. It is not essential that only two units can access the memory. More units may be involved. It is important that a read or write access is an indivisible operation: when a unit has gained access to the memory, it cannot be interrupted by another unit.

2.3. Signalling:

A signalling device is provided between the two units. The signalling acts in one direction, that is to say from A (the message source) to B (the message receiver) and serves to inform B that A has (again) made available (at least) a message. When A supplies a "signal", a "signal" indication occurs in B. B can react thereto at any desired instant. B can also terminate the "signal" indication. It is permissible for both units to be simultaneously active in this respect: A supplies a "signal" while B attempts to reset the "signal" indication. The result of these activities, being coincident or not, is unimportant: the "signal" indication may remain present or be deleted.

2.4. Messages:

The messages may be of any type and any format; this is a matter which can be defined and agreed upon by the units as desired. However, there is one requirement to be satisfied: in each message a space should be reserved in a fixed location for a pointer to a next message, if any.

2.5. Protocol memory elements:

The protocol requires a number of memory positions for the communication between the units. The following elements can be distinguished:

Sections

For the exchange of messages use is made of two or more (preferably two) so-called sections. A section is a space in which a pointer to a message can be inserted. Initially the sections will be empty. The sections are numbered as follows:

|  |
| --- |
| section 0 |
| section 1 |
| . |
| . |
| section n−1; | according to this numbering, the section k is followed by the section (k+1) and the section (n−1) is followed by the section 0.

Empty/not-empty indicators.

With a section there is also associated an empty/not-empty indicator: the indicator indicates whether indeed reference is made to a message or not. When the indicator associated with the section indicated by the pointer (see hereinafter) indicates that the relevant section is empty, the message source may insert the message therein, after which it will set the indicator to the position "not-empty". Conversely, the message receiver may in principle fetch a message from the section indicated by the pointer when the associated indicator is in the position "not-empty".

Thus, the values of the empty/not-empty indicators are:

|  |
| --- |
| Indicator of section 0 |
| empty |
| section 0 not empty. |
| Indicator of section 1: |
| empty |
| section 1 not-empty, etc. |

Initially, the indicators are in the position "empty".

Section pointers

There are two section-pointers: one for the message source and one for the message receiver. Using these pointers, the units keep track of which section will be accessed a next time: the message source for inserting a message therein, and the message receiver for fetching a message therefrom.

This facility is necessary because the pointers are involved in the operation of the empty/not-empty indicators.

Each of the pointers can indicate one of the sections. Therefore, they have n values. Initially both pointers will indicate the same section, for example the section 0. During the execution of the communication operations, the two pointers for the message source and the message receiver pass through the series of sections in the same, invariable manner.

Busy/not-busy indicator.

When the message source wishes to supply a new message, it should set this indicator in advance. It resets this indicator as soon as the protocol activities associated with the supply of the relevant message have been completed. The busy/not-busy indicator indicates the exact section in which the message source is active. The message receiver knows this indicator and interrogates it when it wishes to fetch one or more messages from a section. When the indicator indicates that the message source is busy in the section to be accessed by the message receiver, the latter must stop its attempt. It can then wait until the indicator indicates "not-busy" or until the indicator indicates "not-busy with a message for the relevant section", or it can await a next "signal". This is completely up to the wishes of the message receiver.

Thus, the busy/not-busy indicator in principle has n+1 positions:
not-busy
message source busy with message for section 0
message source busy with message for section 1
message source busy with message for section n−1.

On the basis of all these structural elements a protocol is composed which complies with the described basic principles.

3. The protocol:

The protocol consists of a part which involves the message source (denoted by the letter A) and a part which involves the message receiver (denoted by the letter B). For a proper understanding first the protocol will be described for a bivalent busy/not-busy indicator. Positions: message source busy/message source not-busy. The protocol is executed in a number of program steps which are executed by the relevant units. A more formal description will be given hereinafter.

3.1. Protocol in A:

Action A1: set the busy/not-busy indicator to busy.

Action A2: when the section indicated by the pointer of A is empty according to the empty/not-empty indicator of this section, action A3a must be executed; when the section indicated by the pointer of A is not empty according to the empty/not-empty indicator of this section, action A3b must be executed.

Action A3a: set a pointer to the message in the indicated section; set the empty/not-empty indicator to not-empty; make the section pointer of A indicate the next section.

Action A3b: chain the message to the last message in the row of messages linked to the preceding section.

Action A4: set the busy/not-busy indicator to not busy.

Action A5: apply "signal" to B.

3.2. Protocol in B:

Action B1: deactivate "signal" indicator.

Action B2: terminate the protocol if the busy/not-busy indicator is in the position "busy".

Action B3: terminate the protocol if the empty/not-empty indicator of the section indicated by the section pointer of B is in the position "empty".

Action B4: fetch messages from the section indicated by the section pointer of B.

Action B5: make the section pointer of B indicate the next section.

Action B6: continue with action B1.

3.3. Explanation:

"A" can always unload the message: there is no condition "abandon protocol because B is busy". This is the basic principle. The progress made by B in the processing of the messages determines where A leaves the current message, that is to say in the section indicated by its own pointer or in the preceding section of the series. In principle two possibilities exist:

(1) A always finds the section indicated by its pointer in the empty state. In other words, B is so fast that it never allows the situation to occur in which both sections contain a message (or a chain of messages) while A already supplies a next message. In this case no synchronization problems will occur and the protocol could actually be substantially simplified.

(2) A is confronted by the fact that it must place a message in a section (indicated by the position of its section pointer) which is not empty. In other words, B is lagging in the emptying of the sections. A catches up with B as it were. It would be incorrect for A to chain its message to the preceding message in the indicated section. This is because at the same instant B could be engaged (become engaged) in the emptying of the relevant section (A and B are autonomous units!) This would give rise to a synchronization conflict.

The solution to this problem is as follows. This solution is actually the gist of the invention. When A detects at a given instant that B has not yet emptied the section in which it would like to chain a message, the next section will not have been emptied either by B: B lags as it were by sections. Instead of chaining to the section whereto it intended to chain, A now chains to the preceding section. The objection could be made that although B had not emptied the section indicated by the section pointer of A at the instant at which A tested the section, it might do so immediately after the test. Even worse, it might also continue immediately with the emptying of the next section or sections, at the furthest with the section whereto A is going to chain.

However, comparison of the protocols A and B reveals that in this situation B cannot change over from the emptying of a section to the next section because this is prevented by the busy/not-busy indicator. This is because A always sets the busy/not-busy indicator before doing anything else, while B first tests whether the busy/not-busy indicator is in the position "busy" before it approaches a (next) section. This is the case in the situation considered.

A synchronization problem might also occur in B, that is to say on the following grounds. B wishes to test (usually due to a "signal" indication received) whether a relevant message is available. It may be that, immediately after having found that the section indicated by its section pointer is empty, A inserts a message therein. Thus, there is a risk of B "forgetting" messages. However, this is precluded by the fact that the last action of A is always the supply of a signal, while in its part of the protocol B always resets the signal indication first. It may occur that B responds to a signal in vain: it starts to execute the protocol although there is no message (any longer). However, the protocol can deal with this aspect: it is abandoned when it is indicated that the indicated section does not contain messages.

3.4. A further refinement:

Assume that the following situation occurs. B was slow, several sections (possibly all sections) contain one message (or a chain of messages) in the course of time. Also assume that both section pointers indicate the section 0. A continues with the supply of messages at a high rate. In accordance with the A-protocol, these messages will be chained to the row of messages in the section n−1. A does so with the busy/not-busy indicator in the position busy. B is now liable to find the busy/not-busy indicator constantly in the position "busy", so that it can never fetch a message from the section 0, although there is no objection whatsoever against B fetching these messages from the sections 0 to n−2, even when A is meanwhile busy chaining messages in the section n−1.

In order to enable such fetching, the number of feasible positions of the busy/not-busy indicator (as stated in chapter 2) is increased. The positions are now as follows:

| | |
|---|---|
| 1 | A is not busy |
| 2 | A is busy chaining to section 0 |
| 3 | A is busy chaining to section 1 |
| . | |
| . | |
| n+1 | A is busy chaining to section n−1. |

In the above example the busy/not-busy indicator will then also be in the position n+1. Due to this fact, B will simply empty the sections 0 to n−2 when the time is there. The objection could be made that actually nothing is solved, because B is now halted in the section n−1: after having emptied the section n−2, it will wait for A which is busy filling (supplementing) the section n−1. However, this is not true, because as soon as B has emptied the section 0, A will place a next message in the (meanwhile empty) section 0 again; the busy/not-busy indicator will then have been set to the position 0!B can thus readily start to empty the section n−1. The two units can thus process a stream of messages in parallel, without the message receiver being blocked by the chaining protocol of the message source. The modified protocol is as follows (modifications denoted by capital letters):

Protocol in A.

Action A1: SET THE BUSY/NOT-BUSY INDICATOR AS FOLLOWS:
"NOT BUSY" IF THE PRECEDING SECTION, TAKEN WITH RESPECT TO THE POINTER IS EMPTY.
"BUSY WITH THE PRECEDING SECTION, TAKEN WITH RESPECT TO THE POINTER".
IF THE PRECEDING SECTION, TAKEN WITH RESPECT TO THE POINTER, IS NOT EMPTY.

Action A2: when the section indicated by the pointer of A is empty according to the empty/not-empty indicator of this section, action A3a must be executed; when the section indicated by the pointer of A is not empty according to the empty/not-empty indicator of this section, action A3b must be executed.

Action A3a: set a pointer to the message in the indicated section: set the empty/not-empty indicator 60 not empty; make the section pointer of A indicate the next section.

Action A3b: chain the message to the last message in the row of messages linked to the preceding section.

Action A4: set the busy/not-busy indicator to not busy.

Action A5: apply "signal" to B.

Protocol in B.

Action B1: deactivate "signal" indicator.

Action B2: terminate the protocol if the busy/not-busy indiator indicates
THAT A IS BUSY IN THE SECTION WHEREFROM B WISHES TO FETCH MESSAGES AS INDICATED BY ITS POINTER.

Action B3: terminate the protocol if the empty/not-empty indicator of the section indicated by the section pointer of B is in the position "empty".

Action B4; fetch messages from the section indicated by the section pointer of B; set the associate empty/not-empty indicator to the position "empty".

Action B5: make the section pointer of B indicate the next section.

Action B6: continue with action B1.

3.5. The formal protocol:

In this section a somewhat formal description will be given of the protocol in an ALGOL-like notation.

Variables:
BUSY = −1: B may freely fetch messages from the sections
= 0: A is busy chaining a message in section 0: B may access all sections with the exception of the section 0
= 1: A is busy chaining a message in section 1: B may access all sections with the exception of the section 1
.
.
.
= n−1: A is busy chaining a message in section n−1: B may access all sections with the exception of the section n−1
Initially: −1
EMPTY [k] = −1: section k is empty (initially)
EMPTY [k] = (k+1) mod n: section k is not empty k ∈ (0, ..., n−1)

Initially: −1
I = k: A section pointer indicates section k
Initially: 0
= k: B section pointer indicates section k
Initially: 0
M[0] = section 0
M[1] = section 1
M[n−1] = section n−1

Protocol in A (message source).

BUSY: = EMPTY [I];
IF EMPTY [I] = −1 then do chain into M[I];
    EMPTY[I]: = (I+1) mod n;
    I: = (I+1) mod n;
    end
    else chain into M [(I−1) mod n];
BUSY: = −1;
Signal B;
Exit.

Protocol in B (message receiver).

P:
Reset signal indication;
If (BUSY = J or EMPTY[J] = −1), then exit;
Unchain M[J];
EMPTY [J]: = −1;
J = (J +1) mod n;
Goto P;
/*mod = modulo */

4. Some aspects:

The described communication system utilizes only a limited number of primitives which can be simply implemented. It notably has the following advantageous properties:
1. No deadlock occurs. This would be the case if the units were to wait for one another.
2. No starvation occurs.
   Starvation occurs when one unit continues the supply messages, thus preventing the receiver from processing the messages. In the previous chapter it has already been described how this problem is fundamentally solved by the protocol.
3. The activities for supplying and fetching messages are synchronized in a conflict-free manner (mutually exclusion during accessing of the sections).
4. The sequence in the stream of messages is maintained (FIFO).
5. No messages are lost.
6. All messages are ultimately processed.
   It will never occur that while the message source is busy with something else than the supply of messages, and one or more messages are still chained to the sections, the message receiver no longer has a "signal" indication ready or is not busy with the accessing thereof.
7. The period of time during which the units deploy activities in accordance with the protocol is finite and will not surpass a maximum. This maximum is low because of the limited number of actions to be executed.

The Control of the First-In-First-Out Buffer

Figure 2:
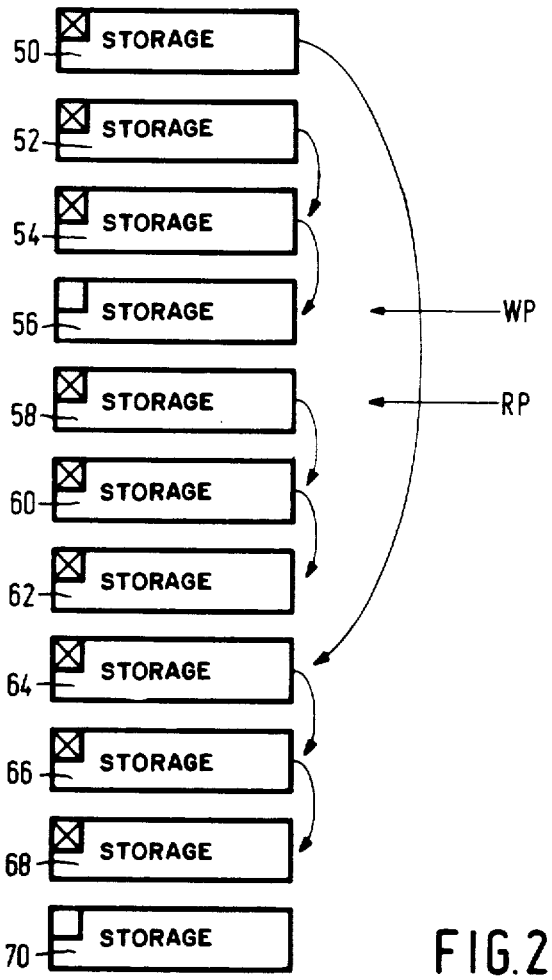
FIG. 2 is an instantaneous representation of some non-branches series.

FIG. 2 shows an example of the organization of a first-in-first-out buffer for n=2. The various signalling bits are situated in a separate part of the memory which is reserved for the relevant transport. When several transport operations are performed together, each transport has such a separated part. Known means ensure that only the two units concerned can access this part. The arbitration will not be described, because this also may be conventional. The assignment of the physical bits to the various quantities is arbitrary. In the figure it is assumed that the sections can also store a message, so that eleven messages can be stored. The figure is an instantaneous view of the execution of the transport operation. The initial sections are 50 and 52. The further storage space for messages is denoted by the reference numerals 54 . . . 70. The control is not shown. The initial section 50 is the first one of a chain which includes further storage spaces 64, 66, 68. After the filling of the section 68 by the source device, the initial section 52 was emptied by the destination device. The initial section 52 was filled and is the first one of a second chain including further storage spaces 54, 56. Storage space 54 is the last one filled. Thus, the write pointer WR indicates, possibly indirectly, the storage space 56 as being the next storage space to be filled outside the initial sections. Per storage space/section a bivalent empty/not-empty indicator is shown. A cross indicates "not empty".

If desired, the indication can be activated only at the instant at which the new information is presented. During the last read operation in the initial section 52, this section was the first one of a chain which included at least the further storage spaces 58, 60, 62. The storage space 60 thereof is indicated, possibly indirectly, by a read pointer RP as being the next storage space to be read. When the storage space 62 has been read in due time, the read pointer RP will indicate the initial section 50. When this section has also been read, the write pointer WP is not written over, but becomes inherently inactive because a control word is always addressed first during write operations.

Although the storage spaces are shown to be consecutive, they may occupy arbitrary locations in the memory. The organization can be realized in the same way as the dynamic assignment of memory pages to a given processing program. The storage spaces may have the same or different storage capacities. All addresses may be formulated physically, logically, indirectly or in accordance with another appropriate addressing technique. One storage space may be sub-divided into parts which are present in different physical locations. The described buffer may form part of a larger memory. In this memory a second buffer organization or even more buffer organizations may be present. The physically present storage spaces may even be available in common to both buffer organizations; in that case only the initial sections are permanently allocated to the same buffer organization. The source device and the destination device may be active in two directions: for each transport path there may be provided a respective buffer, for example one from A to B, one from A to C and one from B to A.

What is claimed is:

1. A communication system which includes a source device for supplying messages according to a predetermined sequence, a destination device for receiving the messages according to a predetermined sequence, and a first-in-first-out buffer which is connected between the source device and the destination device for temporary storage of the messages, which buffer includes a "busy/not-busy" indicator which has a position "not busy" for granting a request for access to the buffer and a position "busy" for rejecting a further request for access during execution of an access operation, and also includes storage means for a read pointer and a write pointer, characterized in that the buffer forms part of a general purpose random access memory in the communication system, there being provided a storage control mechanism with an end-around coupled series of $n \geq 2$ storage control sections whereto a respective non-branched series of messages stored in respective storage spaces can be chained by way of reference information between the storage spaces, the "busy/not-busy" indicator having a number of n "busy" positions, each of which indicates that the source device executes an access operation in respect of a non-branching series associated with a respective storage control section, all storage control sections being provided with a bivalent "empty/not-empty" indicator, there being provided a notification element for storing a "signal" from the source device to the destination device, and memorizing means for indicating one current storage control section for each of the source device and the destination device respectively the source device including means for setting the "busy/not-busy" indicator to the position "busy" for an access operation, for filling the current storage control section for the source device by the memorizing means, when this section is empty, with pointer information indicating a message then supplied, simultaneously setting the "empty/not-empty" indicator for the last mentioned storage control section to the position "not empty" and incrementing the memorizing means in order to indicate a next storage control section of the end-around coupled series as being the current storage control system for the source device, for chaining a next message to be supplied to the non-branched series which starts from a directly preceding storage control section of the end-around coupled series when the storage control section indicated as being the current storage control section for the source device by the memorizing means is not empty, and for always setting the "busy/not-busy" indicator to the position "not busy" after supply of the last mentioned message, and for supplying said "signal" the destination device including means for resetting the notification element in order to deactivate said "signal" in case of an access operation, for terminating the access operation when the "busy/not-busy" indicator is in the position "busy", for terminating the access operation when the "empty/not-empty" indicator for the current storage control section for the destination device is in its position "empty" and, if the access operation is not terminated in this manner, for fetching messages from the non-branching series indicated by the current storage control section in as far as this series goes, for setting the "empty/not-empty" indicator of said current storage control section to its position "empty" when all messages of this series have been fetched, for setting the memorizing means to a next storage control section of the end-around coupled series, and for executing a further access operation as from resetting of said notification element.

2. A communication system as claimed in claim 1, characterized in that n=2 so that there is only a single other storage control section from said current storage control section.

3. A communication system as claimed in claim 1 or 2 characterized in that the source device includes means for setting the "busy/not-busy" indicator to the position "not busy" during an access operation when a preceding storage control section of the end-around coupled series, taken with respect to the write pointer of the source device, is empty, but to the position "busy" with the preceding storage control section of the end-around coupled series, taken with respect to the current storage control section, when the latter control section is not empty, the destination device including means for terminating the access operation under control of the "busy/not-busy" indicator exclusively when the indicator is in the position "busy with the storage control section indicated by the memorizing means as being the current storage control section for the destination device", but not when this indicator is in the position "busy with another storage control section".

* * * * *